United States Patent Office 3,036,048
Patented May 22, 1962

3,036,048
PROCESS FOR POLYMERIZING ETHYLENICALLY UNSATURATED COMPOUNDS
Bela von Falkai, Dormagen, Hans Haberland, Leverkusen-Bayerwerk, Alfred Reichle, Dormagen, and Rudolf Stroh, Leverkusen-Bayerwerk, Germany, assignors to Farbenfabriken Bayer Aktiengesellschaft, Leverkusen, Germany, a corporation of Germany
No Drawing. Filed Oct. 14, 1958, Ser. No. 767,084
Claims priority, application Germany Oct. 15, 1957
7 Claims. (Cl. 260—78.4)

The present invention relates to a process for polymerizing ethylenically unsaturated compounds in the presence of novel catalysts.

It has been found that ethylenically unsaturated compounds, especially ethylenically unsaturated hydrocarbons, can be polymerized under relatively mild conditions with certain novel catalysts to produce high molecular weight, normally solid polymers. These novel catalysts are prepared by admixing borazanes with salts of metals of the 4th to 6th sub-groups and of the 8th group of the Mendelyeev Periodic System.

Examples of borazanes suitable for the process of the present invention are those of the general formula

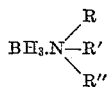

in which R, R' and R'' each represent an alkyl, cycloalkyl or aralkyl radical and R, R' and R'' can be different from or the same as one another. Suitable substituents are for instance methyl-, ethyl-, propyl-, butyl-, isobutyl-, cyclopentyl-, cyclohexyl-, benzyl-radicals.

The following borazanes are examples: trimethyl borazane $(CH_3)_3N.BH_3$, triethyl borazane $(C_2H_5)_3N.BH_3$, tri-n-propyl borazane $(C_3H_7)_3N.BH_3$, dimethyl cyclohexyl borazane $(CH_3)_2(C_6H_{11})N.BH_3$, and dimethyl benzyl borazane.

Suitable salts of metals for producing the catalysts of the present invention are especially salts of titanium and zirconium. Furthermore, salts of the following metals may be used: Hf, Th, V, Nb, Ta, U, Cr, Mo, W, Mn, Fe, Co, Ni, Ru, Rh, Pd, Os, Ir, Pt or mixtures of said metal salts. As to the anions of said salts there come into question the halides, especially chlorides, the oxyhalides and anions of other mineral acids and of organic acids. The term metal salts also comprises organic compounds of said metals such as the alcoholates, phenolates, for example tetraethyltitanate, tetraphenylzirconate, and the metal derivatives of the enol forms of acetylacetone, acetoacetic ester.

Unsaturated compounds suitable for the polymerization in accordance with the process of the invention include monoethylenically and polyethylenically unsaturated compounds especially hydrocarbons such as ethylene, propylene, isobutylene, furthermore alpha-beta monoethylenically unsaturated carboxylic acids such as acrylic acid, methacrylic acid, the nitriles of such acids as for instance acrylonitrile, methacrylonitrile, esters of alpha-beta monoethylenically unsaturated carboxylic acids with monohydric or polyhydric saturated or unsaturated alcohols having 1 to 20 carbon atoms such as methylmethacrylate methylacrylate, dodecylmethacrylate, maleic acid monomethylester, fumaric acid diethylester, acrylic acid cyclohexylester, glycoldimethacrylate, the amides of said acids, vinyl esters, such as for example vinyl chloride, vinylacetate, vinylpropionate, vinylbenzoate, 1.1-dichlorethene, conjugated diolefines having 4–6 carbon atoms, such as butadiene, isoprene, 2-chlorobutadiene-1.3 (chloroprene), dimethylbutadiene, vinylaromatic compounds such as styrene, alpha-methyl-styrene, p-chlorostyrene, p-methylstyrene, furthermore other unsaturated compounds containing one or more ethylenic double bonds which can be polymerized by conventional polymerization methods with the aid of radical-forming catalysts such as peroxides. It is also possible for mixtures of such monomers to be copolymerized by the process of the invention. The present process is of particular signifiance for the polymerization of ethylene, and also of higher homologues of ethylene, such as for example propylene and isobutylene.

The compounds can be polymerized either without pressure or under superatmospheric pressure and preferably at temperatures of about 0 to 150° C., although lower or higher temperatures may also be applied. Aliphatic, cycloaliphatic and aromatic hydrocarbons, such as heptane, isooctane, dodecane, cyclohexane, benzene, toluene, xylenes or other inert, substantially anhydrous liquids can be used as solvents. The proportions of the borazanes and the metal salts which are used can fluctuate within wide limits, but it is preferred to use amounts of 1–10 mols of borazane to 10–1 mols of metal salt preferably about 1–5 mols of borazane to 1 mol of metal salt. The weight ratio of catalyst mixture to monomer can be varied within wide limits, preferably within about 0.1 to about 5 weight percent.

The simplest form of the process from a technical point of view consists in that the borazanes and metal salts are dissolved or dispersed separately in the solvent to be used for the polymerization and both solutions or dispersions are combined while stirring. The monomers to be polymerized are then added to the solutions. It is also possible for the said components to be introduced gradually into the polymerization medium during the polymerization reaction.

Working up is carried out according to conventional methods. For removing the catalysts the polymer obtained can initially be washed with alkaline liquids, then with acid liquids and finally with neutral liquids.

The polymers are suitable for the manufacture of fibres, films, foils and die-cast articles.

Example 1

300 cc. of xylene in a flask fitted with a stirrer and having a gas inlet pipe are freed from air by introducing nitrogen. The solution is heated to 40° C. and 9.8 g. of triethylborazane in 25 cc. of xylene and 8.2 g. of $TiCl_4$ in 25 cc. of xylene are run. With the introduction of ethylene while stirring, the solution slowly becomes dark in color. After polymerizing for several hours, a magma is formed to which 25 cc. of alcohol are added. The polymer is obtained from the solution by filtering with suction and washing first with methanol, then with a 1 percent aqueous solution of NaOH or ammonia, then with 0.1–0.5 percent aqueous hydrochloric acid and finally with water. The material has a melting point of 130–133° C. and a molecular weight of about 200,000.

Example 2

Using the same procedure as in Example 1, but with a 750 cc. autoclave instead of a flask, the polymerization is carried out at a temperature of 70° C. and a pressure of 50 atm. gauge. The same product as in Example 1 is obtained.

Example 3

250 cc. of methylcyclohexane, previously treated with $N_2$, and 5.17 g. of triethylborazane 0.05 mol are introduced under a stream of nitrogen into a 750 cc. autoclave into which nitrogen had previously been blown. A mixture of 7.85 g. (0.0509 mol) of $TiCl_3$ and 0.58 g. of triethylborazane $(BH_3N(C_2H_5)_3)$ in 20 cc. of methylcyclohexane are introduced under nitrogen into a ball mill. The mixture is ground for 16 hours and then introduced with 80 cc. of methylcyclohexane with a stream of nitrogen into the autoclave. The autoclave is heated to 50° C. while stirring and ethylene is introduced. The autoclave is kept at an ethylene pressure of 46 atmospheres while continuously introducing ethylene. After polymerization for 4 hours the pressure is released and the autoclave cooled. 150 cc. of anhydrous methanol are added to the autoclave. The autoclave is stirred for 30 minutes and then opened. The polymer, about 18–22 g., is obtained by filtering with suction and washing. The melting point is 126–130° C., the reduced viscosity about 2.5 and the ash content 0.1 percent.

*Example 4*

The procedure is used as in Example 3, however, the equivalent quantity of n-tripropylborazane (BH₃N(C₃H₇)) is employed instead of triethylborazane. Polymerization is effected at a temperature of 64° C. and a pressure of 64 atm. The same product as in Example 3 is obtained.

*Example 5*

The same procedure is used as in Example 3, however, ZrCl₄ is employed instead of TiCl₃. Polymerization is effected at a temperature of 72° C. and a pressure of 60 atm. The same product as in Example 3 is obtained.

*Example 6*

The same procedure is used as in Example 5 however, n-tripropylborazane is employed instead of triethylborazane. The same product as in Example 5 is obtained.

*Example 7*

100 cc. of xylene in a flask fitted with a stirrer and having a gas inlet pipe are freed from air by introducing nitrogen. The solution is heated to 40° C. and a solution of 3.3 g. of N-triethylborazane is 10 g. of xylene and then a solution of 2.7 g. of titanium tetrachloride in 10 g. of xylene are run in. 200 g. of freshly distilled styrene are run in at 40° C. into the orange-yellow catalyst solution. The solution gradually becomes dark in color. After 12 hours methanol is added to the reaction mixture. A tacky polymer is obtained, which solidifies upon washing with methanol.

What we claim is:

1. In a process for the polymerization of an olefinically unsaturated compound which comprises contacting said compound with a polymerization catalyst in an inert diluent at a temperature of about 0 to 150° C., the improvement comprising employing a polymerization catalyst prepared by combining (1) a borazane of the formula:

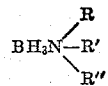

in which R, R' and R" represent a lower alkyl group of from 1–4 carbon atoms and (2) a salt selected from the group consisting of titanium trichloride, titanium tetrachloride and zirconium tetrachloride.

2. The process of claim 1 wherein the catalyst is prepared by combining titanium tetrachloride and triethylborazane.

3. The process of claim 1 wherein the catalyst is prepared by combining titanium trichloride and triethylborazane.

4. The process of claim 1 wherein the catalyst is prepared by combining titanium trichloride and tripropylborazane.

5. The process of claim 1 wherein the catalyst is prepared by combining zirconium tetrachloride and tripropylborazane.

6. The process of claim 1 wherein the catalyst is prepared by combining zirconium tetrachloride and triethylborazane.

7. In a process for the polymerization of an olefinically unsaturated compound which comprises contacting said compound with a polymerization catalyst in an inert diluent at a temperature of about 0 to 150° C., the improvement comprising employing a polymerization catalyst prepared by combining (1) a borazane selected from the group consisting of trimethylborazane, triethylborazane and tri-n-propylborazane and (2) a salt selected from the group consisting of titanium trichloride, titanium tetrachloride and zirconium tetrachloride.

References Cited in the file of this patent

UNITED STATES PATENTS

| | | |
|---|---|---|
| 2,728,758 | Field et al. | Dec. 27, 1955 |
| 2,840,551 | Field et al. | June 24, 1958 |
| 2,899,416 | Schreyer | Aug. 11, 1959 |
| 2,905,645 | Anderson et al. | Sept. 22, 1959 |